Patented July 19, 1938

2,123,898

UNITED STATES PATENT OFFICE 2,123,898

PHENOL-TERPENE RESINOUS CONDENSATION PRODUCTS AND PROCESS OF MAKING THEM

Herbert Hönel, Vienna, and Alois Zinke, Graz, Austria, assignors to Helmuth Reichhold, Detroit, Mich., doing business as Reichhold Chemicals No Drawing. Application July 6, 1935, Serial No. 30,152. In Austria July 17, 1934

20 Claims. (Cl. 260—154)

Our invention relates to a process for the preparation of resinous phenolic condensation products, which are intended for use in the preparation of varnishes and lacquers, particularly oil varnishes, and to the product obtained by such process.

In carrying out the process of our invention we start from the following materials:

1. Alicyclic compounds or such acyclic aliphatic compounds which readily convert into alicyclic compounds or which are readily obtained from alicyclic compounds by common treatments, such as heating. 2. Phenols such as common phenol or its easily available homologues, such as cresols, xylenols or dioxybenzenes or partial ether thereof, such as guaiacol or polynuclear benzenes, such as naphthols. The condensation products obtained from the interaction of 1 and 2 may if desired be reacted with 3 carbonyl compounds, particularly formaldehyde in various ways.

The term terpene will be used in the following description and claims for the compounds mentioned under heading 1 and is intended to comprise:

(1) Terpenes in the restricted sense of the term and such oxygen-free or oxygen-containing, saturated or unsaturated compounds as immediately derive therefrom; (a) hydrocarbons such as limonene, pinene, camphene, having the general formula $C_{10}H_{16}$; menthene; menthane, pinane, camphane, carane; (b) hydroxy compounds and simple derivatives thereof e. g. menthol, terpine, terpineol, borneol; (c) other oxygen compounds more particularly carbonyl compounds: cineol; menthone, pulegone, carvone etc.

(2) Sesquiterpenes and oxygen-free or oxygen-containing, saturated or unsaturated compounds which immediately derive therefrom: (a) e. g. cedrene, cadinene; (b) and (c) analogous to (1): e. g. cedrol, santalol.

(3) Di- and polyterpenes as well as their oxygen compounds: e. g. abietic acid, coniferyl alcohol, amyrines.

(4) Acyclic compounds which readily derive from or may readily be converted into compounds belonging to the classes mentioned under headings (1) to (3); and including (a) so called "terpenogenes" or "olefinic terpenes" in the narrow sense of the term and oxygen-containing simple derivatives thereof: e. g. isoprene, geraniol, linalool, terpine-hydrate, citral; (b) compounds of undefined constitution deriving from substances of the aforesaid classes (particularly those mentioned under headings (2) and (3)), mainly by means of heat treatments or other simple chemical conversions; in many cases these substances constitute cheap waste products.

These compounds are characterized in that they readily form halogen compounds. Suitable halogen compounds are obtained most economically by addition of halogen or hydrogen halides on unsaturated compounds, which addition may or may not be accompanied by simultaneous molecular re-arrangement; or by conversion such as esterification of oxygen-containing compounds with hydrogen halides. From compounds of saturated nature they are formed by substitution with halogen, such as readily takes place at one or several places due to the particular molecular constitution of the terpenes. They may also be obtained by addition, conversion and/or substitution. Unsaturated compounds in which a tertiary carbon atom is connected by a double linkage with another C atom (as illustrated by the grouping

are particularly suitable since they form tertiary halogen compounds (halides) by addition of hydrogen halides; such intermediary products lead to particularly valuable high molecular phenols.

There are many easily available materials which at least contain a high percentage of such chemically strictly determined terpenes as mentioned above. We wish to mention oils of turpentine deriving from natural balsams or from the manufacture of cellulose; dipentenes, conifer oils, pine oil, cumin oil (caraway seed oil), oil of camphor, lemon grass oil, oil of bergamott, gum rosin or wood rosin as well as esters thereof, and other more or less neutral natural soft resins, various decomposition (depolymerization) products of rubber, rosin oils, copal oils, tall oil and other decomposition-products, by-products or waste-products.

According to our invention one or more members of the first group (hereinafter briefly referred to as terpenes or terpene compounds or terpene-like compounds) are chemically combined with one or more members of the second group preferably by producing halogen-compounds, such as by addition or other interaction from suitable terpene compounds and hydrogen halides and causing these products to react with the members of the second group i. e. the phenols in the presence of aluminum chloride, zinc chloride, ferric chloride or other suitable metal halides or substances which form the same under the conditions of the reaction, such as zinc or iron dust.

This chemical combination is based on a condensation reaction and accompanied by the formation of hydrogen halide. The condensation products obtained are to be regarded as monovalent or polyvalent more or less high-molecular phenols in which one or several phenolic benzene rings are chemically fixed in the terpene. They will be hereinafter briefly referred to as "high-molecular phenols" or "terpene phenols".

For our preferred process we either first prepare the hydrogen halide addition- or conversion-products separately or in the presence of the phenol, or we form them intermediately by means of the hydrogen halides set free during the condensation. Halogen halide which has been set free by reacting the phenol with any other suitable organic halogen compound, such as a tertiary alkyl halide or benzyl chloride or the like, may also be used for this intermediate formation. In this case the aforesaid organic halogen compounds serve as additional auxiliary material for initiating the condensation between the phenol and the terpene-like compound.

The last mentioned method of forming hydrogen halide addition- or conversion-products in the presence of phenols, is limited to terpene-like compounds which in the course of the reaction of the hydrogen halide do not form water, such as would render the catalyst inactive or at least would have a very detrimental effect thereon.

However, also in the case of terpene compounds which, like pure hydrocarbons, do not form water with hydrogen halides, the separate preparation of the addition products or other conversion products offers the considerable advantage that the latter can be freed by distillation or crystallization (freezing out) etc. from non-converted or inert fractions or particularly from dark colored by-products and other impurities. When proceeding in this way we obtain particularly light colored terpene-phenols.

If alcoholic compounds, such as borneol, terpineol, terpin hydrate or the so-called pine oil which contains a high percentage of substances of alcoholic nature, are used as starting materials, light colored halides as a rule are also obtained without distillation. When using terpene-like compounds of the latter kind a separate preparation of the halides is positively necessary owing to the simultaneous formation of water.

For the sake of completeness we wish to mention that in some cases (which, as stated above, are restricted to non-alcoholic terpenes) the condensation reaction may be performed by means of aluminum chloride or the like alone. The hydrogen halide necessary for initiating the condensation reaction is formed from the aluminum chloride since traces of water are generally present.

We are able to control our process so as to obtain condensation products of varied character by suitably choosing the proportions, the catalyst, the temperature and other conditions.

By employing relatively small quantities of the phenol particularly when condensing during a relatively short time and when employing small quantities of the catalyst, as a rule soft or even only viscous terpene phenols are obtained. By employing relatively large quantities of the phenol, particularly when extending the duration of condensation and when increasing the proportions of the catalyst, solid resinous, and in individual cases even crystalline substances as a rule are obtained. The latter, however, remain resinous by simple heating. In these solid compounds the proportion of combined phenol is also relatively high.

Unexpectedly we have found that the terpene-phenol condensation products which, when first formed, are in an oily or soft condition and which contain a relatively large proportion of combined terpene or the like, can also be converted into resinous solid products, particularly if being of unsaturated character. This conversion probably is caused by polymerization; we effect it by heating for a particularly long period, preferably in the presence of increased quantities of catalysts. As suitable catalysts there are to be regarded both the hereinbefore mentioned metal halide and the hydrogen halide formed by the condensation and retained in the reaction mixture. Products may be obtained which, notwithstanding a relatively small proportion of combined phenol, indicate the presence of several phenolic benzene nuclei in the molecule. They behave very similarly to terpene-phenols which are obtained from polyvalent terpene halides and phenol, the latter being preferably employed in excess, and which themselves are to be regarded as polyvalent polynuclear phenolic compounds.

The hereinbefore described method of carrying out our process is particularly advantageous because in this way it is also possible to compound practically all the phenol. Without employing a relatively large excess of terpene compound or its suitable halogen compound, uncombined phenol as a rule remains behind and must be removed by washing or by steam or vacuum distillation in order to avoid a disturbing behavior of the product obtained.

On the other hand the process may be modified by further treating the halogen compounds obtained by addition or conversion with hydrogen halide, before condensation with phenols, with halogen. Easily exchangeable hydrogen atoms are substituted by this treatment and in this way terpene derivatives particularly rich in halogen are readily obtained which in turn give rise to the formation of terpene phenols containing a particularly high proportion of combined phenol. The hydrogen halide formed in the course of substitution of the hydrogen which is exchanged, may be used for the formation of new hydrogen halide addition products etc. of terpenes.

A particular advantage of our process resides in the fact that phenolic compounds may be obtained, which show a very high fastness to light and are not accompanied by disturbing yellowing phenomena. This is of particular importance in the case of substances which are to be used directly or indirectly in the manufacture of varnishes or lacquers. Properties as aforesaid as a rule are obtained, if tertiary halides or polyhalides are formed by addition or interaction from terpene compounds or allied compounds and hydrogen halide or halogen.

For recapitulation we wish to state that the first step of our process leads to more or less high molecular phenolic compounds. These contain one or more aromatic nuclei which carry one or more phenolic hydroxyl groups. The aromatic nuclei are bound to more or less high molecular complexes which mostly consist of carbon- and hydrogen-atoms exclusively and which belong to the acyclic aliphatic series or, in the majority of cases however to the alicyclic series. The introduction of aromatic nuclei having phenolic hydroxyl group or groups is effected by first forming from terpenes, sesquiterpenes, polyterpenes or derivatives, or from terpenogenes, or from technical decomposition products of terpenes or polyterpenes, halogen compounds having one or more readily substitutable halogen atoms; these compounds are reacted with phenols according to any suitable method described above.

While we prefer these methods which are according to the principle of the Friedel-Crafts-synthesis, we wish it to be understood that also other methods may lead to the formation of those high molecular phenolic compounds as defined above which we aim to obtain. We mention the Koenigs method according to which unsaturated hydrocarbons are reacted with phenols in the presence of sulphuric acid and glacial acetic acid. Probably by addition acidic esters of sulphuric acid are formed intermediately which esters react in a manner more or less similar to halides. This method, however, is disadvantageous since the sulphuric acid readily reacts with phenols on substitution since the acidic sulphuric esters readily yield alcoholic compounds. Further this method tends to the formation of phenol-ethers and -esters due to the presence of said alcoholic bodies or of the acetic acid. For these reasons very considerable amounts of water-soluble indifferent byproducts are formed which affect the interaction products in a disturbing way while the yield of the desired phenolic high molecular compounds is only a poor one. The reaction products are mainly of oily or viscous consistency while solid resinous interaction products are with difficulty obtained, which products are far from crystalline in character. Particularly disadvantageous are dark colored or even black resinification products of indifferent chemical behavior. They are formed from the unsaturated hydrocarbons by the action of sulphuric acid and can not be eliminated by washing or the like. Also a purification e. g. by distillation in vacuo is not possible, since generally the high-molecular phenols which are aimed at cannot be distilled without decomposition.

Somewhat better is the Schrauth method according to which unsaturated compounds are reacted with phenols with the aid of hydrogen chloride and glacial acetic acid. But, according to this method also the yield of the desired phenolic compounds generally is a poor one and disturbed by the formation of undesirable byproducts, such as esterlike compounds.

In single cases a compounding of unsaturated terpenes as e. g. turpentine or rosin with phenols may also be effected with gaseous or aqueous hydrochloric acid without other auxiliary materials.

From the aforesaid discussion it appears that the phenolic bodies obtained are of oily up to resinous solid character; in certain cases they are also of crystalline nature dependent on the nature of the starting materials, the proportions employed and on the method, the catalyst and its proportion, the temperature, the duration of condensing etc. employed. The phenolic bodies are readily soluble in the usual solvents such as alcohols, hydrocarbons of any kind, chlorinated, ester- or etherlike solvents. Due to their ready solubility in fatty oils we employ them for the preparation of varnishes and lacquers, particularly of oil-varnishes.

The pronounced phenolic character exerts a polymerization-delaying action on drying oils. Even China wood oil can be heated for an unusually long time to the usual polymerization temperatures (i. e. 280° C. or more) in the presence of the resin without coagulating. Owing also to a further specific action of the resins we obtain wood oil varnishes, which are completely gas-proof, i. e. which dry smooth under the severest conditions. Another desirable characteristic of the product is the absence of yellowing phenomena, which are disturbingly noticeable in most phenol-deriving artificial resins particularly during the drying of oil varnishes obtained therefrom. These properties render the resinous high molecular phenols valuable raw-materials for varnishes.

The applicability of our process may be extended very considerably by subjecting to condensation with carbonyl compounds the high-molecular phenols which are obtained according to any of the ways described above. We prefer the employment of formaldehyde, for condensation products of particular technical value may be obtained showing the most various properties. This depends on the proportions, the catalyst, temperature and duration of the reaction and on other controllable conditions. The variability is far broader than otherwise known when condensing phenols with aldehydes. This matter forms the subject of our copending application Serial No. 141,554, filed May 8, 1937.

The following examples may serve for illustration. We wish to be understood positively that they are not restrictive as to the proportions etc. used.

*Example 1*

Gaseous hydrogen chloride is passed into 100 parts by weight of a technical dipentene to the point of saturation. The increase in weight amounts to 40–50%. The dark brown liquid reaction product is distilled in vacuo. During distillation inert impurities of the dipentene at first pass over. The fraction passing over between 110 and 118° C. (14 mms.) contains almost pure dihydrochloride.

209 gms. of this fraction are gradually introduced with constant stirring into 282 gms. of molten phenol in the presence of a few percent of aluminum chloride. After the last addition heating to 50–60° C. is continued for a further 16 hours. The escaping hydrogen chloride is intercepted in a suitable receiver.

A vigorous current of steam is then passed through the thickly liquid reaction product, whereby the excess of phenol employed and a small quantity of dipentene, which has been reformed from the di-hydrochloride, pass over. The residue which amounts to 300 gms. is a light yellow, fairly hard resinous mass. A quantitative conversion of the di-hydrochloride employed with phenol would form 324 gms. of condensation product.

The white crystalline compound which separates out from the carefully dried products, particularly after the latter has been allowed to stand, on rubbing with solvents, such as alcohol, ether and chloroform, is in all probability (1.8) dihydroxydiphenyl-menthane (diphenol-menthane). This appears both from its yield as mentioned, and from its molecular weight as well as from its analysis. We found 81.26% C, 8.83% H, whilst 81.43% C and 8.70% H are calculated. After heating the crude product or the crystals to about 150° C. or more, the entire compound as a rule remains permanently resinous.

Owing to its ready solubility in alcohol and hydrocarbons of every kind and in drying oils etc. as well as to its excellent high fastness, it may be advantageously employed as a varnish or lacquer resin. Its advantageous behaviour when used for the preparation of oil varnishes, particularly China wood oil varnishes, has been described above.

The product is however also very well adapted for condensation with aldehydes, particularly formaldehyde, since artificial resins may be obtained, which are suitable both for the lacquer or varnish industry and also for other known purposes such as molding articles and which are distinguished by their fastness to light and other advantageous properties.

When preparing the diphenolmenthane aluminum chloride may be replaced by zinc chloride, iron chloride, etc. Also instead of primarily forming the dipentene dihydrochloride the dihydrobromide may be prepared and reacted with the phenol in the presence of corresponding metal bromides.

Example 2

A mixture of 500 gms. of o-cresol and 15 gms. of zinc chloride are added in small portions to 209 gms. of dipentene dihydrochloride (1 mol.). The temperature is first maintained slightly above 40° C. and, after the vigorous reaction has abated, is raised to 90° C. and maintained at this point for several hours.

After the reaction mixture has been washed and the excess of cresol employed has been expelled in vacuo or with steam, 320 gms. of a light brown, solid resinous condensation product are obtained. The theoretical yield amounts to 352 gms.

If guaiacol is used as starting material instead of o-cresol, a satisfactory yield of a condensation product of very similar appearance and quality is obtained.

The products obtained according to Example 2 are less light in color than the diphenol menthane obtained according to Example 1, but have similar advantageous properties to the latter, which render them suitable as varnish resins.

Example 3

On passing hydrogen chloride into American turpentine until an increase in weight of approximately 27% has been reached, a mixture of isomeric bornyl chlorides is obtained by molecular re-arrangement. Owing to their being comparatively difficultly saponifiable, the isomers can be separated with the aid of a current of steam into a relatively volatile crystalline chloride and a less volatile liquid chloride. Both isomers can be caused to interact with phenol, which is suitably employed in excess of the calculated quantity with the aid of aluminum chloride, zinc chloride, iron chloride and the like or mixtures thereof as catalyst.

The reaction of these secondary chlorides proceeds considerably more slowly than with dipentene hydrochlorides, the halogen atoms of which are combined with tertiary radicals, and renders the use of higher temperatures advisable. An approximately quantitative conversion may, however, be obtained at about 70° C. or more and using excess of phenol with the crystalline bornyl chloride, particularly with zinc chloride. In the case of the liquid isomers the reaction mixture must be heated to the neighborhood of 100° C., without, however, effecting quantitative conversion.

In both cases there are obtained, after removing the starting materials which have not entered into reaction, fairly light colored, soft resinous terpene phenols, which are readily soluble inter alia in hydrocarbons of every kind and in drying oils. The aldehyde condensation products prepared therefrom in any manner are also readily soluble in the aforementioned substances and therefore constitute satisfactory starting materials for oil varnishes. They are, however, less suitable than the products obtained, for example, according to Example 1, because they show yellowing phenomena even though only to a small degree.

A condensation product may be prepared from this high molecular phenol showing a remarkable hardening capacity and yet being compatible with drying oils and other neutral varnish bases when condensing it with formaldehyde by means of a strong alkaline catalyst and subsequent neutralization.

The bornyl chlorides which according to this example are obtained from treating American oil of turpentine with hydrogen chloride may also be obtained from borneol and gaseous or aqueous hydrochloric acid according to known methods.

The oil of turpentine employed on sufficiently continued treating with hydrogen chloride leads, as is known, by further molecular re-arrangement, to dichloro-menthane which is identical with dipentene-dihydrochloride used in Examples 1 and 2.

The balsamic turpentine oil may be replaced by such turpentine oils as are obtained as byproducts in the manufacture of cellulose, more particularly from processes in which are used alkali hydroxides, sulphides and sulphates.

Example 4

500 grms. of a technical mixture of meta- and para-cresols, 10 grms. of aluminum chloride and 140 grms. of a mixture of dipentene hydrochloride (containing about 40 grms. of combined hydrogen chloride) are brought together and gently warmed. As soon as distinct evolution of hydrogen chloride is observed, 500 grms. of technical dipentene are added in small portions. Each addition is at first followed by an exothermic reaction and each further addition is delayed until hydrogen chloride is again evolved. Finally the mixture is heated to 60–65° C. for a further 40 hours.

After further working up the crude condensate as in Example 1, 905 grms. of a light brown, resinous, solid condensation product, 70 grms. of dipentene fractions which have not taken part in the reaction and 100 grms. of cresol which have not taken part in the condensation are obtained. The m-cresol content of the latter is considerably less than that of the initial mixture.

The resinous condensation product has properties similar to those of the high molecular phenols obtained according to Examples 1 and 2 and may be advantageously employed as a lacquer or varnish resin, particularly for oil varnishes.

The proportion of dipentene hydrochlorides used may be diminished considerably, the proportion of dipentene being enlarged correspondingly; the aluminum chloride may be advantageously replaced by other metal halides, such as zinc chloride or ferric chloride or mixtures thereof. Also the proportions, temperature, time, etc. may be varied considerably.

The high molecular phenol may be condensed with aldehydes yielding also resins useful for the varnish manufacture.

Example 5

Hydrogen chloride is passed at about 40° C. into American pine oil, which consists predominantly of tertiary alcohols and of sesquiterpenes, until an increase in weight of 55% has been reached. The product (100 parts) freed from the aqueous portion formed during the conversion, is condensed at 60–80° C. with an equal quantity by weight of phenol in the presence of zinc chloride (1 part). A reaction can be observed even before the addition of the catalyst, which after the addition proceeds very vigorously and is completed in a few hours.

After removing the phenol employed in excess, and the parts of the terpene compound which have not entered into reaction, 110 parts of a light colored condensation product of hard resinous nature are obtained.

Instead of employing all the conversion product from the pine oil and the hydrogen chloride for the condensation, it may also be cooled down to about 10° C., setting thereby to a crystalline mass. About half of the weight of this mass may be isolated in the form of pure white crystals by suctional filtration. These mainly consist of dipentene di-hydrochloride. If the crystalline mass is reacted with phenol as hereinbefore described, an almost colorless, vary hard resinous high molecular phenol is obtained.

Light colored very lightproof products are also obtained with homologues of phenol.

The products obtained from common phenol in particular are directly suitable as varnish or lacquer resins exactly like the resinous high molecular phenol obtained according to Example 1. Also when condensing with formaldehyde it behaves very similarly.

Instead of distilling off the phenol, which has not entered into reaction, it may be converted by substitution into a homologue having advantageous properties. About 50 parts of tertiary butyl chloride are, for example, gradually added to the reaction mixture, in order to introduce the tertiary butyl group into the nucleus of the phenol. A specific addition of further quantities of catalyst, such as aluminum chloride and the like, is unnecessary.

The terpene phenol compound is unaffected by the butylation and finally a mixture of about 3/5 part of terpene phenol and 2/5 part of p-tertiary butyl phenol is obtained, which has merely to be washed in order to separate the catalyst.

This mixture is particularly suitable for the production of oil-soluble aldehyde resins.

Example 6

100 parts of phenol and 200 parts of technical dipentene, of which a small part was first saturated, separately or in the presence of the phenol, with hydrogen chloride, are condensed at 50–70° C. in the presence of 3 parts of zinc chloride.

If the reaction mixture is subjected after a few hours to steam distillation, about 250–255 gms. of a soft or viscous residue are obtained. If heating is continued for a further 48 to 72 hours, preferably to somewhat higher temperatures, and after increasing the catalyst, about 280–285 grms. of a residue remain after steam distillation in the form of a solid resin. About 15 gms. of inactive fractions of the technical dipentene and a quite small quantity of un-used phenol pass over with the steam. The solid resin has far higher molecular weight than the soft or viscous one primarily obtained. It is noticeable that in the condensation product far more than one mol. of the terpene per one mol. of phenol is combined.

Since the reaction mixture in the subsequent course of the reaction is very viscous, even at, for example 100° C., it is advisable to add an inert solvent, such as a saturated aliphatic or an aromatic hydrocarbon. A diluent as aforesaid is also advantageous for the convenient washing out of the catalyst, etc.

The relative quantity of the dipentene may be still further increased, whereby condensation products and subsequently polymerization products are obtained, in which still much less than one mol. of phenol is combined with one mol. of the original dipentene employed. Such products may have a soft to thickly oily consistency. Solid products may be directly employed as varnish resins as, for example the product obtained according to Example 1.

The condensation reaction, instead of being initiated with dipentene hydrochlorides, may be initiated with the aid of a small quantity of another reactive hydrocarbon halide, for example tertiary-amyl-chloride. As soon as the reaction is in the progress with elimination of hydrogen chloride, the addition of the dipentene is commenced. A small quantity of tertiary amyl phenol is, of course, present in the final condensation product.

Example 7

From dioxybenzenes and terpenes etc. high molecular phenols are obtained capable of forming formaldehyde condensation products which exhibit a particularly high hardening capacity. A considerable advantage consists in that the proportion of the terpene employed or combined may even be relatively very large.

E. g. 1 part of resorcin and 3 parts of dipentene are reacted together in a manner entirely analogous to reaction of the phenol and the dipentene in the foregoing example. After removing inert portions of the dipentene a sticky reaction product is finally obtained. This leads to condensation products of intense hardening capacity e. g. when using hexamethylene tetramine as active methylene compound or when using formaldehyde and e. g. proceeding in a corresponding way as described in Example 3. The high elasticity the resins show after hardening has taken place, is of particular advantage. Considerable proportions of oils including drying oils may be added in order to still further increase the elasticity, without the composition taking place on hardening.

Example 8

High molecular phenols which are particularly rich in phenolic benzene rings, are obtained when proceeding in the following way:

A slow current of chlorine is passed for 10 hours into a solution of 209 grms. of dipentene di-hydrochloride in carbon disulphide. A light honey-yellow colored substitution product (about 240 grms.) which can be almost completely distilled in vacuo up to 120° C. is obtained.

If 100 grms. of the distilled product are condensed with 200 grms. of phenol in the presence of a suitable catalyst, such as zinc chloride, or aluminum chloride, about 200 grms. of an orange-yellow, hard resinous condensation product are obtained after removing the catalyst and the excess phenol. It is soluble in all the usual solvents as well as in drying oils and is light-proof.

Both the increase in weight on chlorination and also the yield of high molecular phenolic products indicate that in the latter three phenol nuclei are combined with the menthane. The hydrogen atom at the tertiary 4-carbon atom was presumably substituted by chlorine, so that the tri-tertiary chlorine formed yielded the light-fast polyphenolic compound.

In this case also the excess phenol instead of being removed can be converted into special derivatives which are left in the reaction mixture. 29 grms. of acetone (½ mol.), or a correspondingly larger quantity of a homologue, or a technical mixture of homologues, such as a mixture of methyl butyl ketone and ethyl propyl ketone, or cyclohexanone, or a methyl cyclohexanone mixture are, for example, added and the reaction mixture is heated for a few days to 40–50° C. The corresponding dihydroxydiphenyl alkane or dihydroxydiphenyl-cycloalkane is formed thereby from the phenol and the ketones under the catalytic influence of the still remaining hydrogen chloride. When employing larger quantities of ketones, soft, resinous compounds of analogous constitution but high molecular weight are formed.

The mixture of the phenolic compound, like the terpene phenolic compound itself, may be employed inter alia for the preparation of phenol-formaldehyde condensation products which do not turn yellow.

Example 9

Hydrogen chloride is passed with cooling into 150 grms. of cumin (caraway seed) oil, until 100 grms. have been absorbed. On strong cooling if necessary after previous distillation in vacuo, a crystalline mash is obtained, from which almost pure dipentene di-hydrochloride can be separated.

The portion which remains liquid yields, on condensation with phenol (in equal parts) and using zinc chloride as catalyst and subsequent working up and removal of the excess phenol as in the preceding examples, a light brown solid, resinous condensation product.

This product may be employed as a varnish resin or may be condensed with aldehyde in the most various ways using widely varied proportions.

Example 10

Phenol (4 parts) and isoprene (1 part) are gently warmed in a flask provided with a reflux condenser until the first dissolves, zinc chloride (0.1 part) is added and a slow current of hydrogen chloride is passed through for 1 hour. The temperature is first kept below 25° C. by intense cooling, after several hours gradually raised and finally kept at 70–80° for 12 hours after all of the isoprene has entered into reaction. The reaction mixture thereupon is treated in a way as described in Example 1. The high molecular phenol (approximately 3 parts) represents a light brown solid resin which may be used for preparing varnishes or for condensation with aldehydes yielding thereby resins of the most various properties and applicability.

High molecular phenols of an external appearance similar to that of phenolic bodies such as obtained from isoprene and phenol are obtained from various homologues of the latter. As a rule, however, they are less adapted to form intensely hardening formaldehyde condensation products.

Example 11

Hydrogen chloride is passed with cooling into 152 grms. of geraniol. The proportion taken up which amounts to about 115 grms., indicates that quantitative addition has taken place as well as the hydroxyl group has also been esterified. On distilling in vacuo the main quantity passes over between 115 and 125° C.

If the product is condensed with an equal quantity of phenol with the aid of a catalyst, such as zinc chloride etc., almost quantitative substitution takes place and red-brown fairly soft resinous product is obtained.

The isomeric linalool takes up less hydrogen chloride and yields a smaller quantity of interaction product, which is thickly liquid and dark green.

Example 12

Hydrogen chloride is passed into a mixture of 100 grms. each of phenol and Copal oil, derived from the destructive fusion process of Kongo copal, until an increase in weight of about 6 grms. has taken place. The passage of hydrogen chloride may also be continued to the point of saturation, about 20 grms. being necessary therefor. Condensation is thereafter effected at 60–80° C. for 24 hours with the aid of zinc chloride or aluminum chloride or similar catalysts. After suitable working up, about 120 grms. of a resinous condensation product are obtained, in which about ⅜ part by weight of phenol are chemically combined with ⅝ part by weight of reactive portions of the copal-oil.

The condensation product shows a distinctly phenolic character and may be employed, for example, for the production of resins readily soluble in oil or be used directly as a varnish resin. Condensation products of similar consistency are also obtained from phenol homologues and Copal oil. The Copal oil may, however, be replaced by the oily decomposition products which result on heating recent soft resins, such as ordinary colophony, to temperatures above 300° C. and which are likewise rich in unsaturated compounds. The formation of decomposition products as aforesaid is frequently unavoidable when fusing colophony e. g. for preparing esters, owing to local overheating, and consequently like Copal oil they constitute a very cheap waste material.

Condensation with formaldehydes leads to resins of various properties. When employing e. g. the method described in Example 3 an oil soluble heat hardening resin is obtained from condensation with formaldehyde.

Example 13

220 grms. of bromine are slowly dropped into 100 grms. of technical dipentene with intense cooling below −10° C. The reaction mixture becomes very dark after the first portions of bromine have been added, but becomes pale again during the later course of adding. The bromine is chemically combined by addition, a small portion of the technical dipentene, however, reacts with substitution, hydrogen bromide being formed thereby.

The addition and conversion product is reacted with 500 grms. of phenol with the aid of 2 grms. aluminum bromide. After suitably removing the catalyst and the phenol and dipentene having not entered into reaction or being recovered, about 310 grms. of a dark colored hard resinous body are obtained showing distinct phenolic character.

It may be used as such for the preparation of varnishes or serve to produce condensation products with aldehydes.

We wish to repeat that the preceding examples are to be regarded as illustrative only, but not as restrictive. The proportions, catalyst and other auxiliary materials, temperature, time and many other conditions may be varied to a very considerable extent. While the application of diminished pressure is preferable in many cases as said in the examples, increased pressure may also be applied advantageously in many cases, such as the condensation with aldehydes.

For producing the high molecular phenols we prefer the method of first separately or intermediately preparing halogen compounds of the terpenes etc. and then reacting these with the phenols in the described ways. It is to be regarded as advantageous that the interaction may be carried out in a common inexpensive iron vessel since the iron is only very slightly affected by the anhydrous hydrogen halides. Very probably it even acts catalytically in an advantageous way due to the formation of iron halides.

Among the different ways of forming formaldehyde condensation products from the high molecular phenols the method is of particular importance, according to which strong alkalies and subsequent neutralization are employed, such as is described in detail in Examples 3, 4, 5 and 6, the formaldehyde preferably being employed in considerable excess over the equimolecular quantity.

In the following claims the term "terpene" is intended to comprise: unsaturated, and saturated, oxygen-free and oxygen-containing organic compounds of vegetable origin which are derived from (a) alicyclic (mono- and polycyclic) terpenes, sesquiterpenes and polyterpenes in the narrow sense of the terms, (b) acyclic (aliphatic) terpenes or terpenogenes i. e. compounds which are readily converted into alicyclic terpenes etc. and (c) compounds of undefined nature which easily are obtained by common decomposition, including depolymerization, from alicyclic compounds enumerated sub (a).

What we claim is:

1. A process of producing a substituted high molecular phenolic compound which comprises condensing together in the presence of a condensing agent capable of eliminating hydrogen halide (1) a halogen compound derived from a terpene of vegetable origin, and (2) a phenol which is a member of a group consisting of monovalent and polyvalent mononuclear and polynuclear phenols; whereby substitution of the halogen atoms by phenolic benzene rings takes place, thereby forming a substituted high molecular phenolic compound and hydrogen halide.

2. A process according to claim 1, in which the halogen compound is formed by additively combining a hydrogen halide and an unsaturated terpene.

3. A process according to claim 1, in which the halogen compound is formed by additively combining a hydrogen halide and unsaturated alicyclic terpene having the general formula $C_{10}H_{16}$.

4. A process according to claim 1, in which the halogen compound is formed by esterification of an alcoholic alicyclic terpene with hydrogen halide.

5. A process according to claim 1, in which the halogen compound is formed by additively combining hydrogen chloride and an unsaturated alicyclic terpene having the general formula $C_{10}H_{16}$.

6. A process according to claim 1, in which the halogen compound is formed by esterification of an alcoholic alicyclic terpene with hydrogen chloride.

7. A process according to claim 1, in which the halogen compound is formed by additively combining a hydrogen halide and dipentene.

8. A process according to claim 1, in which the halogen compound is formed by additively combining a hydrogen chloride and dipentene.

9. A process according to claim 1, in which the halogen compound used is 1,8-dichloro-menthane.

10. A process according to claim 1, in which part at least of the halogen compound is intermediately formed by additively combining an unsaturated terpene and a hydrogen halide set free in the course of the substitution process, said intermediate formation not being accompanied by the production of water.

11. A process according to claim 1, in which the halogen compound is a dipentene hydrochloride, the main part of which is formed by intermediate additive combination of dipentene with hydrogen chloride set free in the course of the substitution reaction.

12. A process according to claim 1, in which the phenol is employed in excess over the equivalent quantity of halogen compound calculated on substitutable halogen atoms.

13. A process according to class 1, in which dichloromenthane is used and phenol in excess over the equivalent quantity, the excess being removed after substitution has taken place, whereby substantially pure dihydroxy diphenyl-menthane is obtained.

14. A process according to claim 1, in which the halogen compound is employed in excess over the equivalent quantity of the phenol whereby practically all the phenol employed is converted by substitution into a high molecular phenol.

15. A process as set forth in claim 1, wherein the halogen compound is employed in excess over the equivalent quantity of the phenol, and wherein the phenolic substitution product primarily obtained which is of only viscous consistency is converted into a solid resinous product by means of an extended heat-treatment in the presence of the condensing agent.

16. A process as set forth in claim 1, wherein the halogen compound is employed in excess over the equivalent quantity of the phenol, the halogen compound mainly at least being formed by additively combining an unsaturated terpene and hydrogen halide set free in the course of the substitution process, and wherein the phenolic substitution product primarily obtained which is of only viscous consistency is converted into a solid resinous product by means of an extended heat-treatment in the presence of the condensing agent, said intermediate formation of the halogen compound not being accompanied by the production of water.

17. A process according to claim 1, in which the phenol is employed in excess over the equivalent quantity of halogen compound calculated on substitutable halogen atoms, the excess of phenol still present in the reaction mixture being converted by means of known methods into substituted phenols.

18. A process according to claim 1, in which the condensing agent employed is a member of the group consisting of aluminum chloride, ferric chloride, zinc chloride and substances forming same under the conditions of the reaction.

19. A process according to claim 1, in which an initial reaction temperature of slightly above 40° C. is raised to about 90° C. and maintained at this point for several hours.

20. A substituted high molecular phenolic compound formed by condensing together in the presence of a condensing agent capable of eliminating hydrogen halide (1) a halogen compound derived from a terpene of vegetable origin, and (2) a phenol which is a member of a group consisting of monovalent and polyvalent mononuclear and polynuclear phenols; whereby substitution of the halogen atoms by phenolic benzene rings takes place, thereby forming a substituted high molecular phenolic compound and hydrogen halide.

HERBERT HÖNEL.
ALOIS ZINKE.